US008888889B2

(12) United States Patent
Glicksman et al.

(10) Patent No.: US 8,888,889 B2
(45) Date of Patent: Nov. 18, 2014

(54) METHOD OF MAKING NON-HOLLOW, NON-FRAGMENTED SPHERICAL METAL OR METAL ALLOY PARTICLES

(75) Inventors: Howard David Glicksman, Durham, NC (US); Sheryl Ehrman, Washington, DC (US); Alex Langrock, Laurel, MD (US); George Lee Peabody, V, Annapolis, MD (US); Kai Zhong, College Park, MD (US)

(73) Assignees: E I du Pont de Nemours and Company, Wilmington, DE (US); University of Maryland, College Park, MD (US)

( * ) Notice: Subject to any disclaimer, the term of this patent is extended or adjusted under 35 U.S.C. 154(b) by 190 days.

(21) Appl. No.: 13/150,631

(22) Filed: Jun. 1, 2011

(65) Prior Publication Data

US 2011/0293939 A1 Dec. 1, 2011

Related U.S. Application Data

(60) Provisional application No. 61/350,151, filed on Jun. 1, 2010.

(51) Int. Cl.

| | |
|---|---|
| ***B22F 9/24*** | (2006.01) |
| ***B22F 9/30*** | (2006.01) |
| ***C22B 5/00*** | (2006.01) |
| ***B22F 1/00*** | (2006.01) |
| ***B01J 2/02*** | (2006.01) |

(52) U.S. Cl.

CPC ................ *B01J 2/02* (2013.01); *B22F 1/0007* (2013.01); *B22F 1/0051* (2013.01); *B22F 9/30* (2013.01)

USPC .................. 75/343; 75/347; 75/363; 75/369; 75/395; 75/413

(58) Field of Classification Search

USPC .................... 75/343, 363, 369, 347, 395, 413

See application file for complete search history.

(56) References Cited

U.S. PATENT DOCUMENTS

| | | | | |
|---|---|---|---|---|
| 5,429,657 A * | 7/1995 | Glicksman et al. | ............. | 75/351 |
| 5,439,502 A * | 8/1995 | Kodas et al. | ..................... | 75/365 |
| 6,338,809 B1 | 1/2002 | Hampden-Smith et al. | | |
| 6,679,938 B1 | 1/2004 | Kim et al. | | |
| 6,943,346 B2 * | 9/2005 | Tan et al. | ...................... | 250/288 |
| 2003/0094596 A1 * | 5/2003 | Kijima et al. | .......... | 252/301.4 R |

OTHER PUBLICATIONS

PCT International Search Report, dated Apr. 2012.

* cited by examiner

*Primary Examiner* — Holly Le

(57) ABSTRACT

The invention is directed to systems and methods for making non-hollow, non-fragmented spherical metal or metal alloy particles using diffusion dryers.

18 Claims, 4 Drawing Sheets

METHOD OF MAKING NON-HOLLOW, NON-FRAGMENTED SPHERICAL METAL OR METAL ALLOY PARTICLES

FIELD OF THE INVENTION

The invention is directed to making non-hollow, non-fragmented spherical metal or metal alloy particles.

TECHNICAL BACKGROUND OF THE INVENTION

Metal and metal alloy powders have many important applications, especially in electronics and dental industries. Metal and metal alloy particles are widely used in conductor compositions for hybrid integrated circuits, multilayer ceramic capacitors, actuators and other uses.

There are many methods currently used to manufacture metal powders. These include chemical reduction methods, physical processes such as atomization or milling, thermal decomposition, and electrochemical processes. These processes tend to be very hard to control and give irregular shaped particles that are agglomerated. In addition, these processes are either unable to make alloy particles that contain greater than two elements or the particle sizes are very large and the alloy ratios are very hard to control.

The aerosol decomposition process involves the conversion of a precursor solution to a powder. (See U.S. Pat. No. 6,338,809, which is incorporated herein by reference.) This process involves the generation of droplets, transport of the droplets with a gas into a heated reactor, the removal of the solvent by evaporation, the decomposition of the salt to form a porous solid particle, and then the densification of the particle to give fully dense, spherical particles. Conditions are such that there is no interaction of droplet-to-droplet or particle-to-particle and there is no chemical interaction of the droplets or particles with the carrier gas.

SUMMARY OF THE INVENTION

An embodiment of the invention relates to a material that is a spherical non-hollow, non-fragmented metal or metal alloy powder containing one or more of the following elements: Au, Bi, Cd, Co, Cr, Cu, Fe, Ge, Hg, In, Ir, Mn, Mo, Ni, Pd, Pb, Pt, Re, Rh, Ru, Sb, Sn, Ti, W, Zn.

A further embodiment relates to a method for the manufacture of spherical non-hollow, non-fragmented particles including one or more metals including the steps:

a. providing a precursor solution including a solvent and one or more thermally decomposable metal containing compounds;

b. forming an aerosol including finely divided droplets of the precursor solution dispersed in a carrier gas;

c. passing the aerosol through one or more diffusion dryers, d. heating the aerosol wherein, upon heating, spherical metal particles are formed, e. quenching the metal particle aerosol, and f. collecting the spherical metal particles.

An additional embodiment relates to conductor compositions prepared in the form of an ink or a paste that are suitable for forming a conductor film, the conductor composition including spherical non-hollow, non-fragmented metal or metal alloy particles.

A further aspect relates to devices that contain spherical non-hollow, non-fragmented metal or metal alloy particles.

DETAILED DESCRIPTION OF THE INVENTION

Definitions

Figure 1:
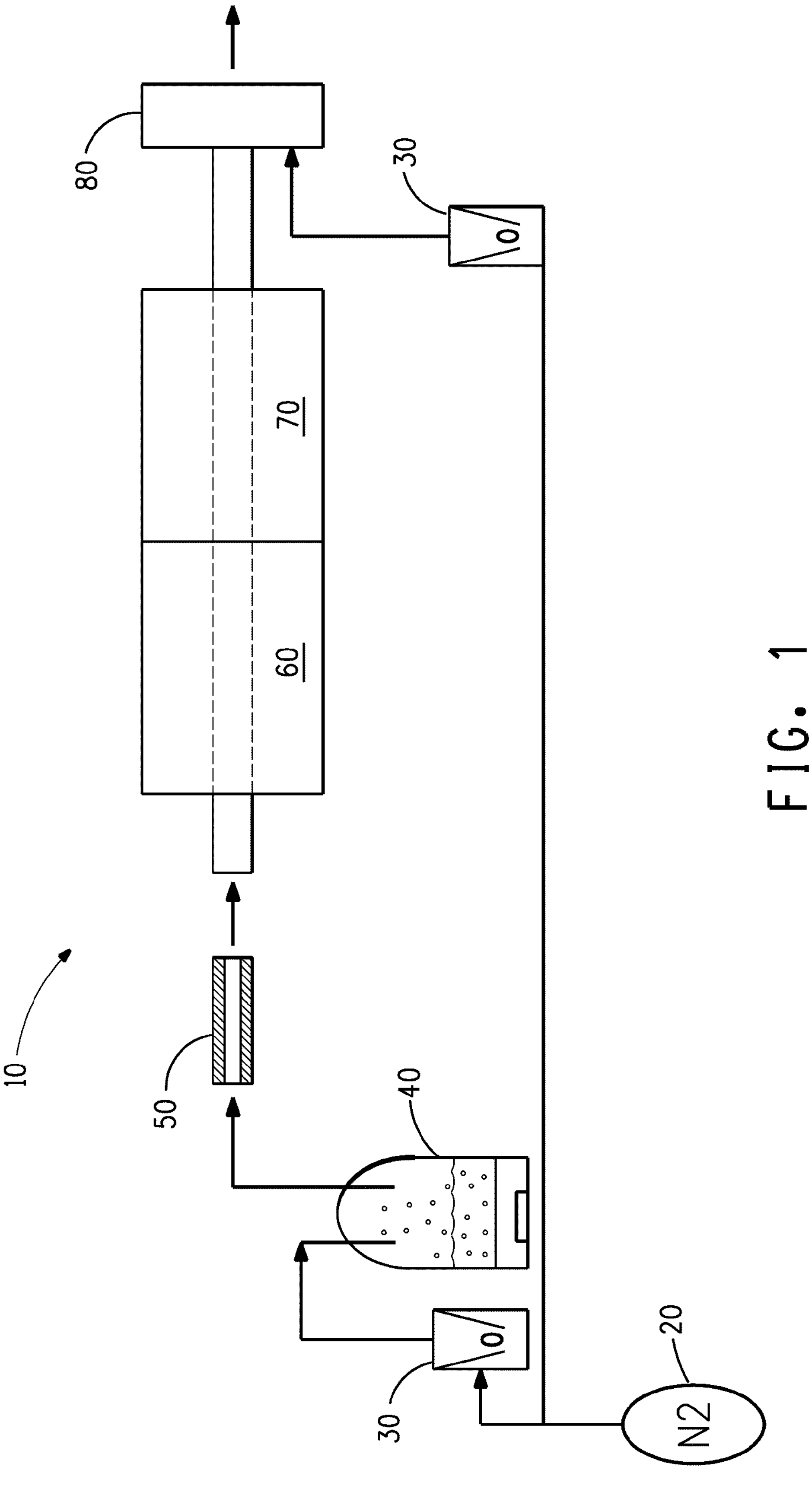
FIG. 1 illustrates a conventional apparatus for droplet generation used to prepare aerosols.

As used herein with respect to the solvent, the term "volatilizable" means that at least a portion of the solvent is converted to vapor or gas by the time the highest operating temperature is reached, whether by vaporization and/or by decomposition. In an embodiment, greater than 70% of the solvent is converted to vapor or gas by the time the highest operating temperature is reached, whether by vaporization and/or by decomposition.

As used herein with respect to the term "thermally decomposable" means that at least a portion of the compound is decomposed to the metal and volatilized by-products by the time the highest operating temperature is reached. In an embodiment, greater than 70% of the compound is decomposed to the metal and volatilized by-products by the time the highest operating temperature is reached. In an embodiment, greater than 90% of the compound is decomposed to the metal and volatilized by-products by the time the highest operating temperature is reached. For example, $AgNO_3$, $Co(NO_3)_2$, $Pd(NO_3)_2$ are decomposed to form $NO_x$ and Ag and Pd metal, respectively.

Any soluble metal salt can be used in the method of the invention so long as it is inert with respect to the carrier gas used to form the aerosols. Examples include metal nitrates, phosphates, sulfates, acetates, and the like. Specific examples include the suitable salts: $AgNO_3$, $Ag_3PO_4$, $Ag_2SO_4$, $Pd(NO_3)_2$, $Pd_3(PO_4)_2$, $Pt(NO_3)_2$, $Co(NO_3)_2$, $Co(C_2H_3O_2)_2$, $Pb(NO_3)_2$ and the like. In an embodiment, the metal compounds may be used in concentrations as low as 0.2 mole/liter and upward to just below the solubility limit of the particular salt. In a further embodiment, concentrations are greater than about 0.2 mole/liter and less than about 90% of saturation.

Very small, colloidal metal particles may also be used provided the particles form a stable suspension.

Method for the Manufacture of Spherical Particles Including One or More Metals

An embodiment relates to a method for the manufacture of spherical particles comprising one or more metals. The method includes the steps:

a. providing a precursor solution including a solvent and one or more thermally decomposable metal containing compounds;

b. forming an aerosol including finely divided droplets of the precursor solution dispersed in a carrier gas;

c. passing the aerosol through one or more diffusion dryers, d. heating the aerosol wherein, upon heating, spherical metal particles are formed, e. quenching the metal particle aerosol, and f. collecting the spherical metal particles.

In an embodiment, the thermally decomposable metal containing compounds may include thermally decomposable forms of one or more metals selected from the group consisting of: Ag, Au, Bi, Cd, Co, Cr, Cu, Fe, Ge, Hg, In, Ir, Mn, Mo, Ni, Pd, Pb, Pt, Re, Rh, Ru, Sb, Sn, Ti, W, and Zn. For example, the metal may be in the form of a salt known to one of skill in the art, including but not limited to: $AgNO_3$, $Ag_3PO_4$, $Ag_2SO_4$, $Pd(NO_3)_2$, $Pd_3(PO_4)_2$, $Pt(NO_3)_2$, $Co(NO_3)_2$, $Co(C_2H_3O_2)_2$, $Pb(NO_3)_2$ and the like. In an embodiment, the metal compounds may be used in concentrations as low as 0.2 mole/liter and upward to just below the solubility limit of the particular salt. In a further embodiment, concentrations are greater than about 0.2 mole/liter and less than about 90% of saturation.

In an embodiment, the carrier gas may include one or more gases selected from the group consisting of: air, nitrogen, and hydrogen. In an embodiment, the carrier gas may include an inert gas, wherein the inert gas does not react with the metals included in the particles. In a further embodiment, the carrier gas may include a reducing gas. The carrier gas may include nitrogen and 4% hydrogen.

Virtually any vaporous material which is inert with respect to the solvent for the metal containing compounds may be used as the carrier gas for the practice of the invention. Examples of suitable vaporous materials are air, nitrogen, oxygen, steam, argon, helium, carbon dioxide and the like.

In another embodiment nitrogen is the carrier gas for elements that form stable metal oxides at temperatures below 1200° C. Examples of these elements include Co, Mo, Fe, Mn, Cu, Ni, and the like. In some end uses the presence of metal oxides in the alloy powder is acceptable or desirable. In an alternative embodiment reducing gases such as hydrogen or carbon monoxide may be blended with nitrogen to form the carrier gas. The reducing gas may be present in amounts up to 2, 4, 6, 8 or 10 mole percent.

In an embodiment, any of the conventional apparatus known to one of skill in the art for droplet generation may be used to prepare the aerosols, including but not limited to: nebulizers, Collison nebulizers, ultrasonic nebulizers, vibrating orifice aerosol generators, centrifugal atomizers, two-fluid atomizers, electrospray atomizers and the like.

In addition, for a given aerosol generator, concentration of the solution of the metal containing compounds has an effect on particle size. In particular, particle size is an approximate function of the cube root of the concentration. Therefore, the higher the silver-containing and non-silver-containing compounds concentration, the larger the particle size of the precipitated metal or metal alloy. If a greater change in particle size is needed, a different aerosol generator must be used.

In an embodiment, the collection temperature of step e may not condense any solvent onto the spherical metal particles.

In an embodiment, the droplet concentration of step b may be below the concentration where collisions and subsequent coalescence of the droplets results in a 10% reduction in droplet concentration.

In an embodiment, in step c, 10% to 50% of the solvent in the aerosol particles may be removed.

In an embodiment, the type of apparatus used for a diffusion dryer is not by itself critical. The diffusion dryer is used to remove water from the glass-crystalline particle components aerosol particles. In an embodiment, the diffusion dryer may include a cartridge with two concentric circles that contains a solvent removal material. For example, with water, suitable water removal materials include silica gel, clays, calcium oxide, calcium chloride, magnesium chloride, and calcium sulfate. In an embodiment, the solvent removal material may include silica gel The aerosol particles flow through the diffusion dryer to remove 10% to 50% of the solvent. Removing no solvent or less than 10% solvent produces hollow particles. Removing too much solvent products fragmented particles. Removing between 20% and 40% of the solvent will produce non-hollow, non-fragmented particles.

In an embodiment, in step c, the time in the diffusion dryer may be between 25% and 200% of the time the particles are being heated of step d.

The temperature range over which the method of the invention may be carried out is quite wide and ranges from the decomposition temperature of the metal containing compounds to the melting point of the formed spherical metal or metal alloy particles.

The type of apparatus used to heat the aerosol in step d is not by itself critical and either direct or indirect heating may be used. For example, tube furnaces may be used or direct heating in combustion flames may be used. In an embodiment, the temperature may not go above the melting point of the formed multi-element, alloy powder containing silver and at least two non-silver containing elements.

In an embodiment, the heating of step d may be between 600° C. and 1500° C. In an aspect, the heating of step d may be above the decomposition temperature of the metal containing compounds but below the melting point of the formed spherical metal particles.

Upon reaching the reaction temperature and the spherical metal or metal alloy particles are formed, they are quenched, and collected by one or more devices such as filters, cyclones, electrostatic separators, bag filters, filter discs and the like.

In an embodiment, the dense spherical, pure particles may be non-fragmented. In a further aspect, the dense spherical particles are non-hollow.

In an embodiment, the precursor solution of step a may include a co-solvent. The co-solvent may include an organic compound having 1 to 5 carbons. In an embodiment, the co-solvent may include an alcohol. The co-solvent may be present in an amount of about 1% to about 50% by volume of the solution.

In an embodiment, the co-solvent may act as a reducing agent of the metal oxides, may be vaporizable, may be inert with respect to the carrier gas, may be miscible with the primary solvent, and may have a carbon number from 1 to 5 carbons. Examples of suitable co-solvents include alcohols, esters, ethers, ketones, and the like. In an embodiment, the co-solvents may be present in the solution in an amount from 1% to 50%, or in a further embodiment 5% to 20%, by volume.

In an embodiment, the precursor solution of step a may include seed particles. The seed particles may be colloids.

In an embodiment, the concentration of the soluble metal containing compounds in the aerosol may be below the saturation concentration at the feed temperature, and in an aspect at least 10% below the saturation concentration.

In an embodiment, the concentration of droplets in the aerosol may be sufficiently low so that it is below the concentration where collisions and subsequent coalescence of the droplets results in a 10% reduction in droplet concentration.

In an embodiment, the temperature of the reactor may be below the melting point of the formed spherical metal or metal alloy.

EXAMPLES

Referring to FIG. 1, the Spray pyrolysis reactor system 10 was composed of a N2 gas supply 20, a rotameter 30, droplet generator 40, a diffusion dryer 50 and a tube furnace 60, 70 and a particle filter for collection 80. In the examples herein, the droplet generator 40 was an ultrasonic generator with a frequency of 1.65 MHz was used, The tube furnace 60, 70 had a total length of 32 inches and a diameter of 2 cm with a temperature range from 100° C. to 1200° C. Nitrogen was used as the carrier gas, and the aerosol flow rate was adjusted from 1 L/min to 5 L/min using a rotameter 30. Diffusion dryers 50 were 13 inch long tubes containing two concentric circles where the outer circle containing packed silica gel. Diffusion dryers 50 were added between droplet generator 40 and furnace 60, 70 to pre-dry the droplets. Different numbers of diffusion dryers were selected to optimize the final product.

Example 1

87.24 g of Ni (2) nitrate-hexahydrate was carefully weighed and put into a clean 250 mL volumetric flask. 100 mL of ethylene glycol was poured into the flask and the flask was filled with deionized water. The metal salt was completely dissolved giving a precursor solution with concentration of 1.2M nickel nitrate and 40% ethylene glycol. Precursor solution was then pumped into ultrasonic nebulizer, where solution was atomized into an aerosol. Nitrogen gas was used as the carrier gas at a flow rate of 2 liters/min. The temperature of the furnace was 1000° C. Particles were collected and the crystalline phase and morphology of the particles were determined by X-ray diffraction (XRD) and scanning electron microscope (SEM) respectively. (FIG. 2. condition a, and FIG. 3.*a*) Small amount of nickel oxide was detected and hollow particles were observed.

Figure 2:
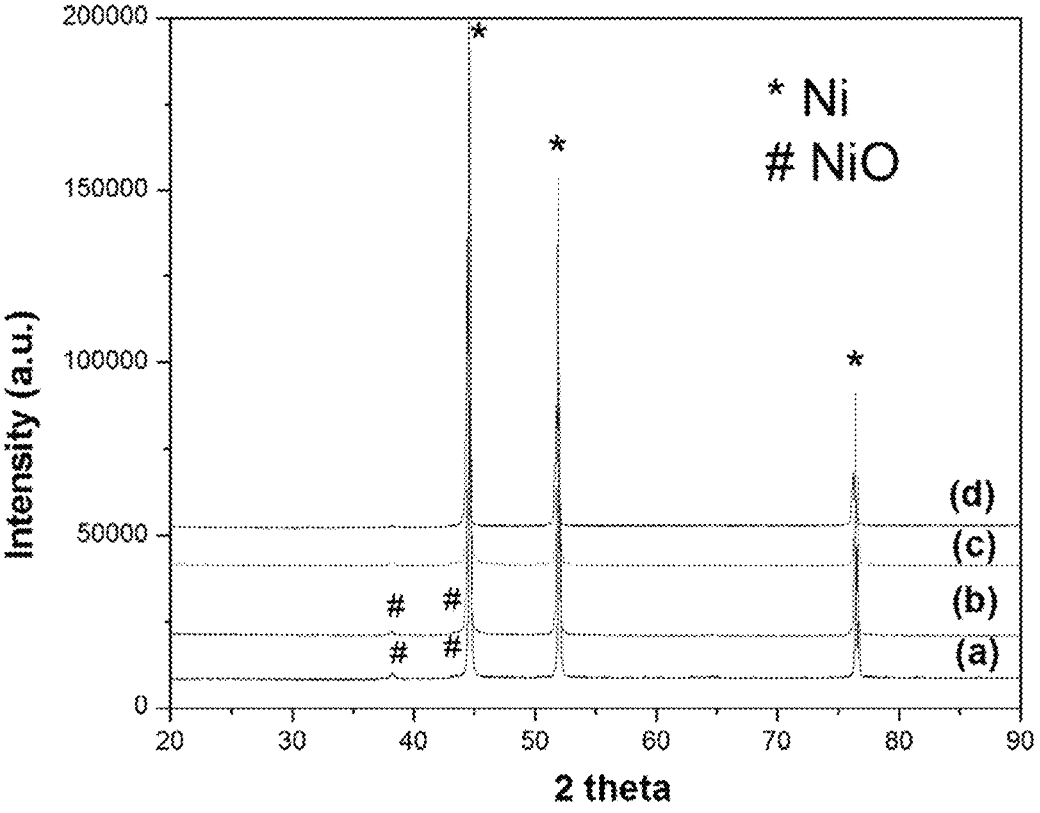
FIG. 2 illustrates the X-ray diffraction of the Ni/NiO particles prepared in different experimental conditions.

FIG. 2 shows the XRD of the Ni/NiO particles prepared in different experiment conditions: (a) 1000° C., 2 L/min; (b) 1000° C., 1 L/min; (c) 1000° C., 1 L/min and one diffusion dryer; and (d) 1000° C., 1 L/min and three diffusion dryers.

FIG. 3 shows SEM pictures of the Ni/NiO particles prepared in different conditions: (a) 1000° C., 2 L/min; (b) 1000° C., 1 L/min; (c) 1000° C., 1 L/min and one diffusion dryer; and (d) 1000° C., 1 L/min and three diffusion dryers.

Example 2

Figure 3A:
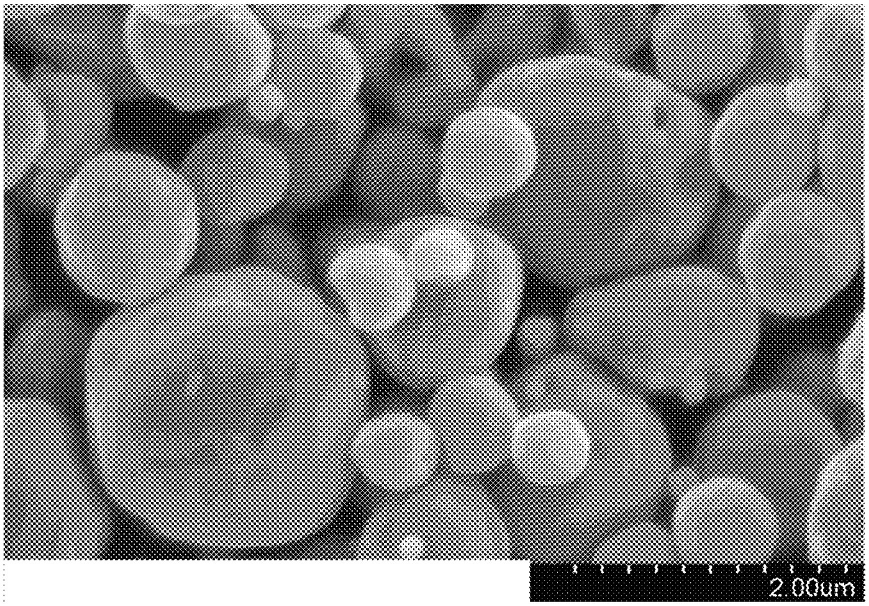
FIG. 3A illustrates SEM pictures of the Ni/NiO particles prepared in 1000° C., 2 L/min.
Figure 3B:
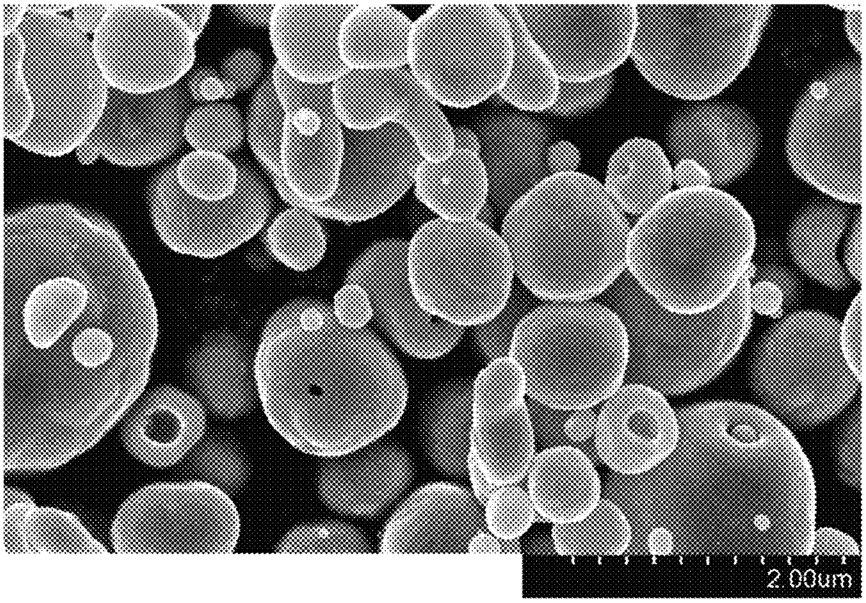
FIG. 3B illustrates SEM pictures of the Ni/NiO particles prepared in 1000° C., 1 L/min.

Similar conditions to example 1 were used except that the nitrogen carrier gas flow rate was 1 liter/min. Small amount of nickel oxide was found and hollow particles were observed. (FIG. 2 condition b, and FIG. 3*b*)

Example 3

Figure 3C:
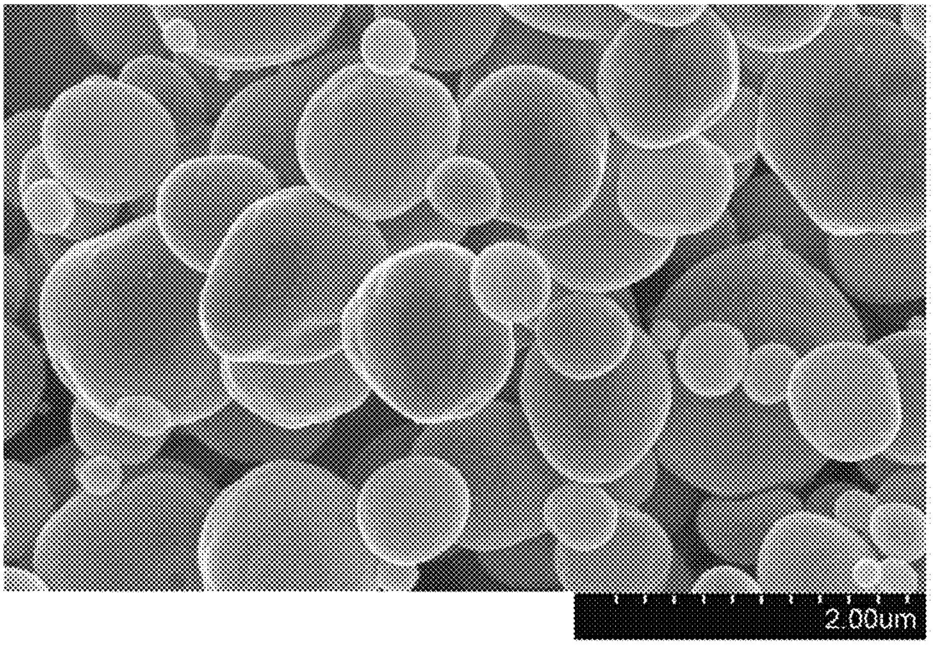
FIG. 3C illustrates SEM pictures of the Ni/NiO particles prepared in 1000° C., 1 L/min and one diffusion dryer.

Similar conditions to example 2 were used except that a 13 inch long diffusion dryer containing calcium chloride and magnesium chloride as the desiccant was placed between the aerosol generator and the furnace. No nickel oxide was observed and very few hollow particles were found (FIG. 2 condition c, and FIG. 3*c*).

Example 4

Figure 3D:
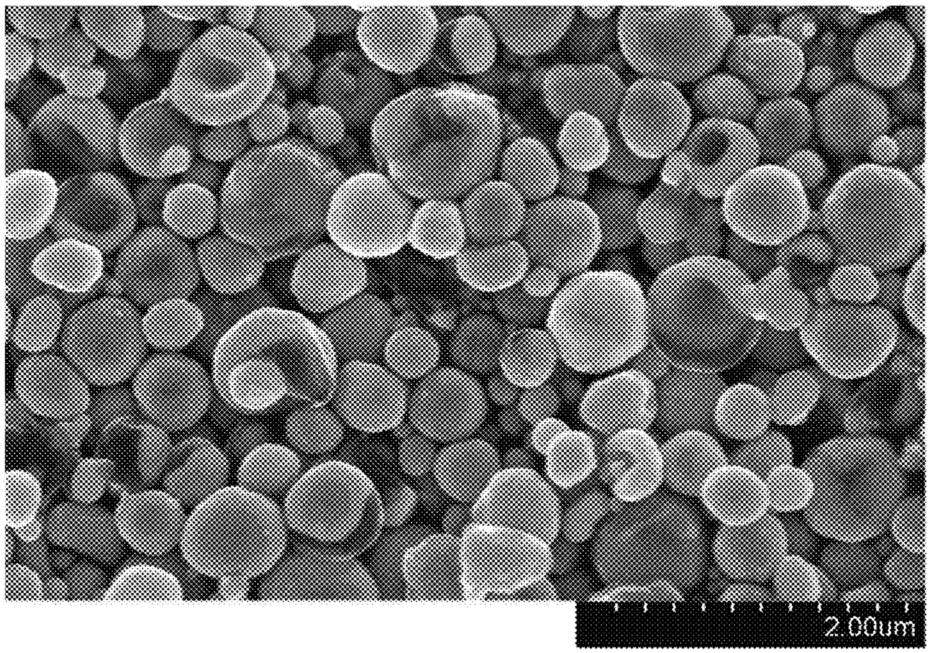
FIG. 3D illustrates SEM pictures of the Ni/NiO particles prepared in 1000° C., 1 L/min and three diffusion dryers.

Similar conditions to Example 3 were used except three 13 inch long diffusion dryers containing calcium chloride and magnesium chloride as the desiccant were placed between the aerosol generator and the furnace. No nickel oxide was observed, no hollow particles were observed, but fragmented particles were observed in the scanning electron microscopy pictures (FIG. 2. conditions c and d, and FIG. 3*d*).

The invention claimed is:

1. A method for the manufacture of spherical particles comprising one or more metals, comprising the steps:

a. providing a precursor solution comprising a solvent and one or more thermally decomposable metal containing compounds;

b. forming an aerosol comprising finely divided droplets of the precursor solution dispersed in a carrier gas;

c. passing the aerosol through one or more diffusion dryers, wherein 10% to 50% of the solvent in the aerosol particles is removed;

d. heating the aerosol wherein, upon heating, spherical metal particles are formed, e. quenching the metal particle aerosol, and f. collecting the spherical metal particles, wherein the time in the diffusion dryer is between 25% and 200% of the time the particles are being heated of step d, wherein the spherical metal particles collected are non-fragmented, non-hollow.

2. The method of claim 1 wherein the metal containing compounds of step a contain one or more of the following metals: Ag, Au, Bi, Cd, Co, Cr, Cu, Fe, Ge, Hg, In, Ir, Mn, Mo, Ni, Pd, Pb, Pt, Re, Rh, Ru, Sb, Sn, Ti, W, Zn.

3. The method of claim 1 wherein the quenching of step e has a collection temperature that does not condense any solvent onto the spherical metal particles.

4. The method of claim 1 wherein the droplet concentration in forming the aerosol in step b is below the concentration where collisions and subsequent coalescence of the droplets results in a 10% reduction in droplet concentration.

5. The method of claim 1 wherein passing the aerosol through one or more diffusion dryers in step c 20% to 40% of the solvent in the aerosol particles is removed.

6. The method of claim 1 wherein the heating of step d is between 600° C. and 1500° C.

7. The method of claim 1 where the heating of step d is above the decomposition temperature of the metal containing compounds but below the melting point of the formed spherical metal particles.

8. The method of claim 1 wherein the carrier gas of step b comprises air.

9. The method of claim 1 wherein the carrier gas of step b comprises an inert gas.

10. The method of claim 1 wherein the carrier gas of step b comprises nitrogen.

11. The method of claim 10 wherein a co-solvent is present in an amount of about 1% to about 50% by volume of the solution.

12. The method of claim 1 wherein the carrier gas of step b comprises a reducing gas.

13. The method of claim 1 wherein the carrier gas of step b comprises nitrogen gas and 4% hydrogen gas.

14. The method of claim 1 wherein the precursor solution of step a further comprises a co-solvent.

15. The method of claim 14 wherein the co-solvent comprises an organic compound having 1 to 5 carbons.

16. The method of claim 15 wherein the co-solvent comprises an alcohol.

17. The method of claim 15 wherein the precursor solution of step a comprises seed particles, wherein the seed particles are colloids.

18. The method of claim 1 wherein the precursor solution further comprises seed particles.

* * * * *